United States Patent [19]
Emerson

[11] 4,070,907
[45] Jan. 31, 1978

[54] FUEL DELIVERY METER

[75] Inventor: Reginald Stanley Emerson, Buckingham, England

[73] Assignee: Leslie Hartridge Limited, Buckingham, England

[21] Appl. No.: 761,058

[22] Filed: Jan. 21, 1977

[30] Foreign Application Priority Data

Jan. 23, 1976 United Kingdom ............. 2705/76

[51] Int. Cl.² ............................................. G01F 9/00
[52] U.S. Cl. ................................................ 73/119 A
[58] Field of Search ................. 73/119 A, 114, 113

[56] References Cited
U.S. PATENT DOCUMENTS 3,423,998  1/1969  Blomgren .................. 73/119 A X
3,527,089  9/1970  Emerson ...................... 73/119 A Primary Examiner—Jerry W. Myracle
Attorney, Agent, or Firm—Berman, Aisenberg & Platt

[57] ABSTRACT

A fuel delivery meter for measuring and indicating the quantity of fuel delivered by engine fuel injection means "on test" comprising a chamber for receiving the fuel, a spring-loaded piston or plunger within the chamber which is displaced as fuel enters the chamber, indicating means which are actuated by displacement of the piston or plunger to give a reading which corresponds to the amount of fuel which has entered the chamber, and fuel flow means for passing fuel into the chamber on the other side of the piston or plunger so as to warm the meter.

4 Claims, 14 Drawing Figures

FUEL DELIVERY METER

This invention relates to fuel delivery meters, recorders and other such apparatus for measuring and indicating the quantity of fuel delivered by engine fuel injection means of internal combustion or compression ignition engines.

Engine fuel injection means can take a variety of forms. For example, to quote two specific constructions, they may comprise a fuel injection pump serving a number of engine cylinders, or one or more fuel injectors, one for each engine cylinder, each having its own pumping piston or plunger. Similarly, the character of the apparatus used in practice to measure and indicate the quantity of fuel delivered by engine fuel injection means varies considerably from manufacturer to manufacturer. For the sake of convenience, however, all such apparatus will be referred to herein generically as "fuel delivery meters."

According to the invention, a fuel delivery meter for measuring and indicating the quantity of fuel delivered by engine fuel injection means "on test" comprises a chamber for receiving the fuel, a spring-loaded piston or plunger within the chamber which is displaced as fuel enters the chamber, indicating means which are actuated by displacement of the piston or plunger to give a reading which corresponds to the amount of fuel which has entered the chamber, and fuel flow means for passing fuel into the chamber on the other side of the piston or plunger so as to warm the meter.

Preferably the spring-loaded piston or plunger is guided by guide means comprising two PTFE 'O' rings urged apart by a spring, with each ring abutting against a concave conical surface so as to press the inner surfaces of the rings against a piston rod of the piston or plunger.

The meter can incorporate either one of two alternative fuel circuits. In the first form of circuit, two simple solenoid valves are included, while in the second form of circuit there is one simple solenoid valve and one two-way or three-port solenoid valve.

Some examples of fuel delivery meters in accordance with the invention are shown in the accompanying drawings, in which.

Figure 1:
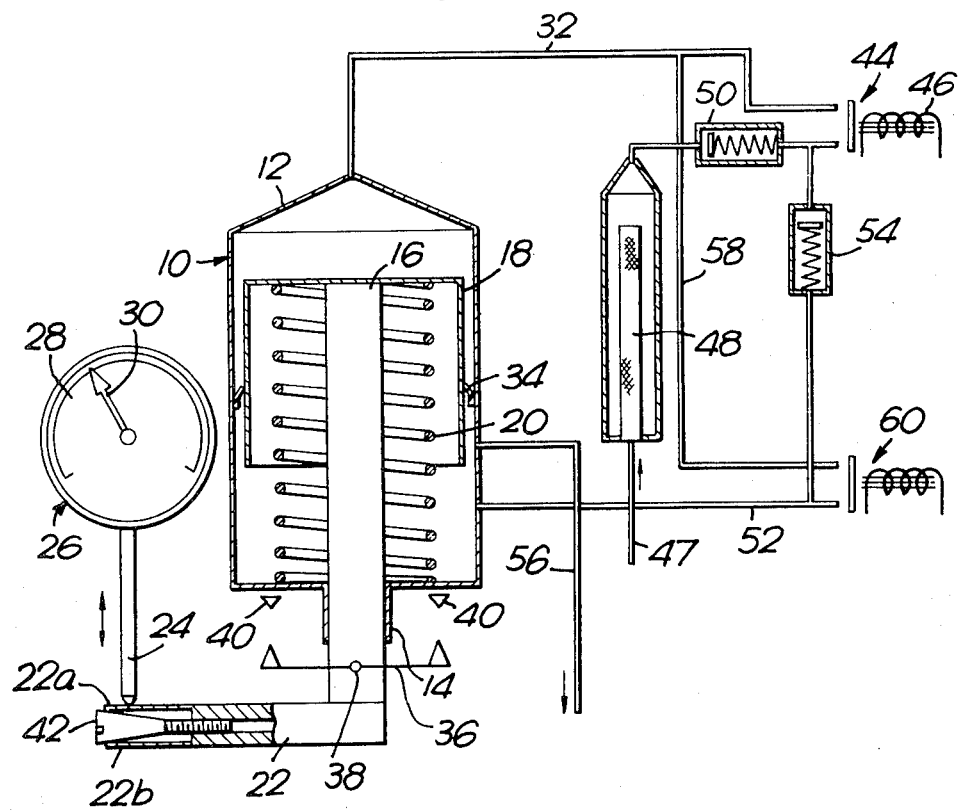
FIG. 1 is a diagrammatic illustration of one form of meter in accordance with the invention.

Referring first to FIG. 1, the meter shown diagrammatically therein comprises a cylindrical chamber 10 which is closed at its upper end 12 and open at its lower end 14 for the passage therethrough of a piston rod 16 connected to a piston or plunger 18 which is arranged for axial sliding displacement in the chamber 10. A coiled compression spring 20 surrounding the piston rod 16 urges the piston or plunger 18 towards the closed upper end 12 of the chamber.

The lower end of the piston rod 16 has an outwardly projecting arm 22 fastened to it. This arm is split along the axis of a conical adjusting screw 42 screwed into the arm and serves to actuate the axially movable stem 24 of a fuel-delivery indicator 26 having a dial 28 and a rotary pointer 30. As the stem 24 moves axially, so is the pointer moved clockwise or counter-clockwise on the dial 28.

The meter operates on the principle that fuel delivered to the upper end of the chamber through an inlet line 32 is able to displace the piston or plunger 18 downwards within the chamber by a distance directly proportional to the quantity of fuel which enters the chamber through the line 32, the said displacement of the piston or plunger then being used to actuate the stem 24 of the fuel-delivery indicator 26. To prevent fuel which enters the chamber 10 through the inlet line 32 from leaking round the piston or plunger 18, a sealing ring 34 is let into the inner wall of the chamber 10 and bears in a liquid-tight manner on the circumferential surface of the piston or plunger.

At the lower end of the piston rod 16, but above the arm 22 which actuates the stem 24 of the fuel-delivery indicator 26, is a bridge member 36 which is pivotally mounted by means of a pivot pin 38 on the piston rod. This bridge member is arranged to seat accurately on stop members or contacts 40 on the underside of the chamber 10 when the piston or plunger 18 is in its uppermost position. This permits the pointer 30 of the fuel-delivery indicator 26 to be properly zeroed by means of the conical adjusting screw 42 which spreads apart the upper and lower sides 22a and 22b of the arm 22 as the screw 42 is screwed further into the arm.

The delivery of fuel into the upper end of the chamber 10 from engine fuel injection means to be tested by the meter is controlled by a valve 44 actuated by a solenoid 46, the fuel flowing along a connecting line 47 joined to the fuel injection means being passed first through a filter 48 and a spring-controlled valve 50 before it reaches the said solenoid valve 44. When, therefore, the solenoid 46 is energized by the operator operating a switch (not shown), the valve 44 is opened to permit fuel delivered by the engine fuel injection means to enter the upper end of the chamber 10 through the line 32. It will then begin to displace the piston or plunger 18 downwards, and this displacement causes the arm 22 on the piston rod 16 to actuate the stem 24 of the fuel-delivery indicator 26.

When the solenoid valve 44 is shut — for example, prior to or at the end of a test — oil passes from the spring-controlled valve 50 through a second spring-controlled valve 54 to a duct 52. Similarly, at the end of a test, oil in the chamber 10 above the piston or plunger 18 is evacuated from the chamber by operation of a solenoid valve 60 which opens to allow such oil to enter the duct 52 via a line 58 connected to the line 32. As will be appreciated, oil is forced out of the chamber by the action of the spring 20 which pushes the piston or plunger 18 upwards.

It has been found that, if accurate readings are to be obtained on the indicator 26, it is important for the fuel in the meter to be at the right temperature, as a difference of 1° C. in the differential temperature of the fuel and the meter can adversely affect the reading given by the pointer 30 of the indicator 26. Accordingly, provision is made for all fuel entering the duct 52 to pass through the chamber 10 below the piston or plunger 18 at a reduced pressure before returning to a fuel tank (not shown) via a drain duct 56. This serves to keep the temperature of the meter very close to the temperature of the fuel to be measured.

Figure 2:
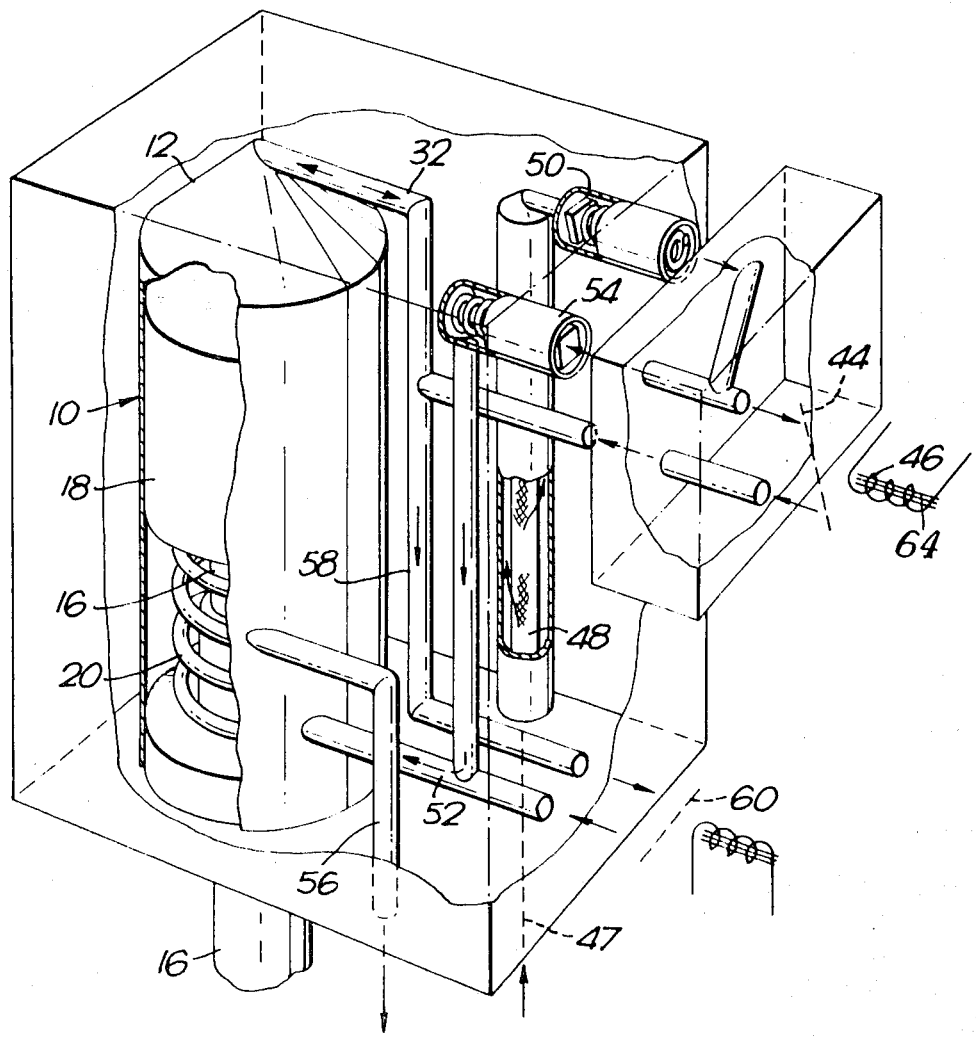
FIG. 2 is a diagrammatic perspective view of part of the meter shown in FIG. 1.

FIG. 2 shows a production form of the meter diagrammatically illustrated in FIG. 1 but with the indicator 26 and certain other parts omitted, the same reference numerals in the latter Figure being applied to corresponding parts in FIG. 2. If desired, the meter can have two coaxial springs instead of the single spring 20 shown in FIGS. 1 and 2. This is of advantage from the manufacturing point of view where the meter is made with two different sizes of piston to enable it to handle two ranges of fuel flow, the larger piston having two springs and the smaller piston having only one spring.

There are two ways of operating the meter described above, these being as follows:

1. When not measuring, both valves 44 and 60 are closed. To take a measurement, the valve 44 is opened to pass fuel to the chamber 10 and is closed to stop flow to the chamber. As a separate function to drain the chamber, the valve 60 is opened to permit the spring 20 to push the piston or plunger 18 upwards so that fuel flows out of the chamber, the valve 60 being then closed to reseal the chamber preparatory to taking the next reading.
2. When not taking a reading, both valves 44 and 60 are open. To take a reading, the valve 60 is closed to prevent fuel from escaping from the chamber 10 and therefore causing it to fill. To terminate the reading, the valve 44 is closed (with valve 60 still closed). This traps the metered fuel in the chamber. As a separate function to drain the chamber, both valves 44 and 60 are opened and are left open until the next reading is to be taken.

A typical operation of the meter shown in FIGS. 1 and 2 can therefore be as follows.

It is first assumed that the engine fuel injection system is assembled on a test bench for testing and not on the engine. Fuel issuing from each of the injectors of the engine fuel injection system passes along its respective connecting line 47, there being a separate meter for each injector. From the line 47, the fuel passes through the filter 48 to the spring-controlled pressurising valve 50, thence to the spring-controlled relief valve 54. From here the fuel passes through a duct 52 to the underside of the piston 18 in order to keep the system warm. It finally returns to the fuel tank (not shown) through the drain duct 56. The solenoid valve 44 is operated automatically by a counting mechanism on the test machine (not shown) when a fuel reading is required. At initiation of this counting mechanism, the solenoid valve 44 is energized and opens to permit the flow of fuel at an elevated pressure into the line 32 and thence into the chamber 10 where the fuel depresses the piston 18 against the action of its biassing spring 20. At the termination of the predetermined count of the fuel injection pump turns, the solenoid valve 44 is de-energized and so prevents the further ingress of fuel into the chamber 10. The increase in fuel content in the chamber 10 above the piston 18 is then indicated by the pointer 30 against the scale 28.

After reading the scale 28, and before taking a further reading, the solenoid valve 60 is energized (either automatically by the test machine or by manual means) and this causes fuel to be forced out of the chamber 10 due to the action of the biassing spring 20 acting on the piston or plunger 18. Fuel which thus passes through the solenoid valve 60 enters the duct 52 and, subsequently, the drain duct 56, whence it returns to the tank.

The upward movement of the piston 18 and its piston rod 16 is terminated by contact of the bridge 36 with the two contacts 40. This brings the pointer 30 back to a zero reading (the screw 42 having been set correctly) and at the same time makes electrical contact between the two contacts 40. Until this electrical contact is made therefore, operation of the valve 44 by the counting mechanism on the test machine is inhibited.

The alternative mode of operation of the valves 44 and 60 mentioned above will, it is thought, be clear from the above description of the first mode of operation.

Although these two alternative methods of operation are perfectly practical, they do have one or two drawbacks. In the first method of operation, the valve 44 is closed when not taking a reading and therefore the fuel has to escape through valve 54, which raises the back pressure in the inlet line 47. When taking a reading, however, the valve 54 is no longer in operation, and therefore the pressure in the inlet line 47 is reduced. This causes a small pulse of fuel to enter the cylindrical chamber 10 due to the relaxation of pressure in the inlet line 47. The reading, therefore, tends to be high by a fixed amount. In the second method of operation, both solenoid valves 44 and 60 are open when not taking a reading and the fuel does not therefore have to pass through the valve 54 in order to escape. This means that the inlet line is already at the reduced pressure. But, when the valve 60 is moved into its closed position to take a reading, the fuel now has to overcome the spring 20 above the piston, and this slightly increases the pressure in the inlet line. This produces a slight negative pulse, due to the fact that the fuel now has to expand the inlet line slightly, and therefore produces an error in that the reading given by the pointer 30 tends to be low by a fixed amount (although the error is much less than in the case of the first method of operation).

Figure 3:
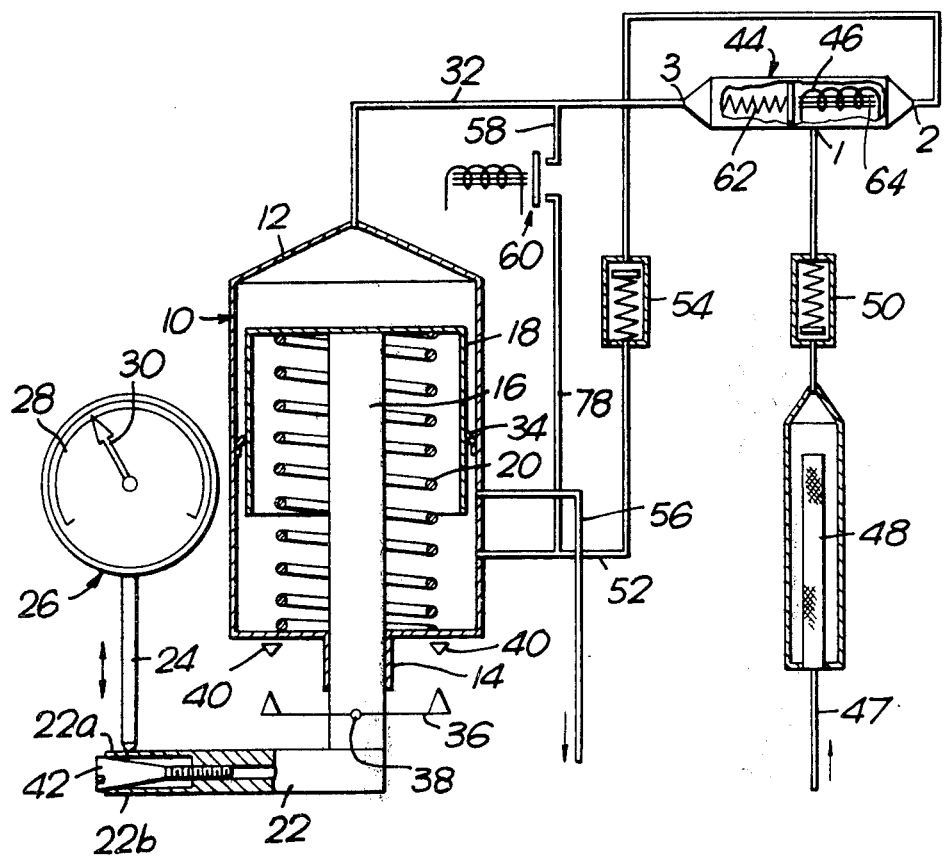
FIG. 3 is a diagrammatic illustration of a second form of meter in accordance with the invention.
Figure 4:
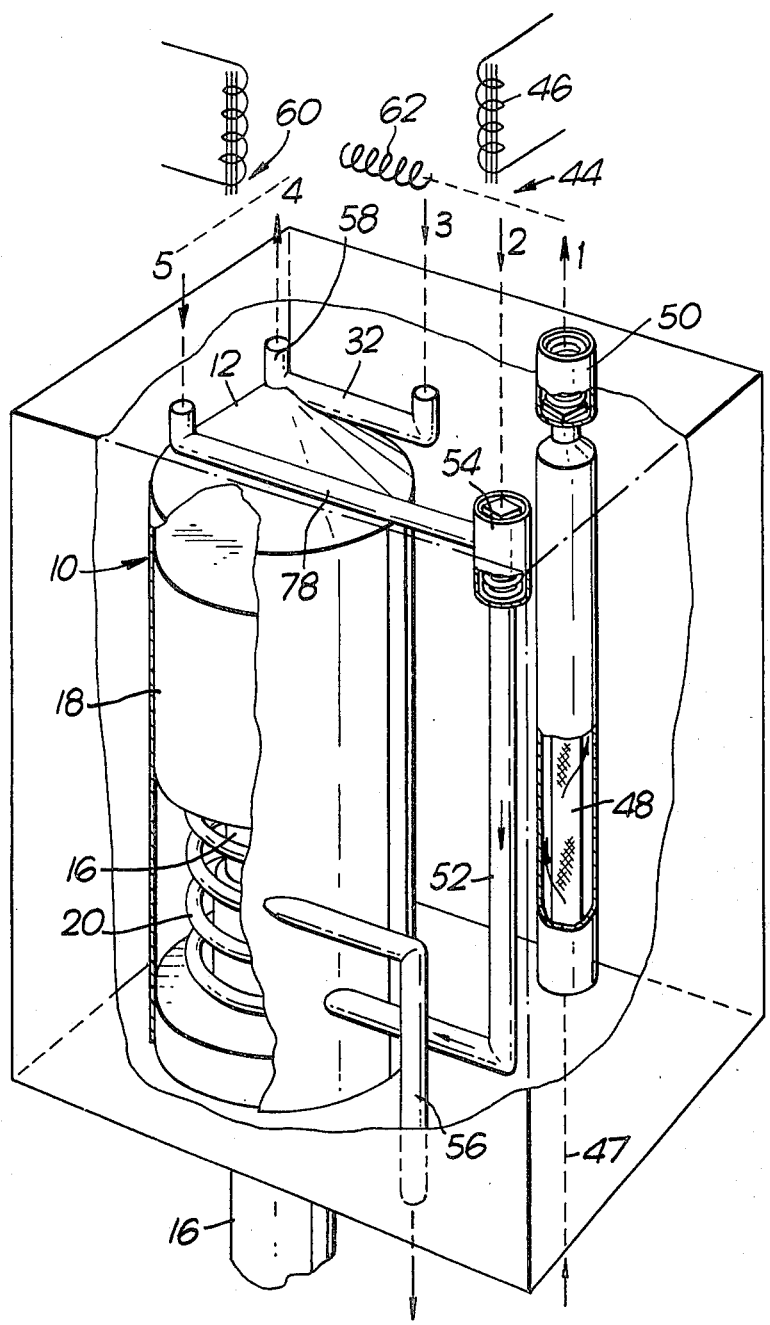
FIG. 4 is a diagrammatic perspective view of part of the meter shown in FIG. 3.
Figure 5:
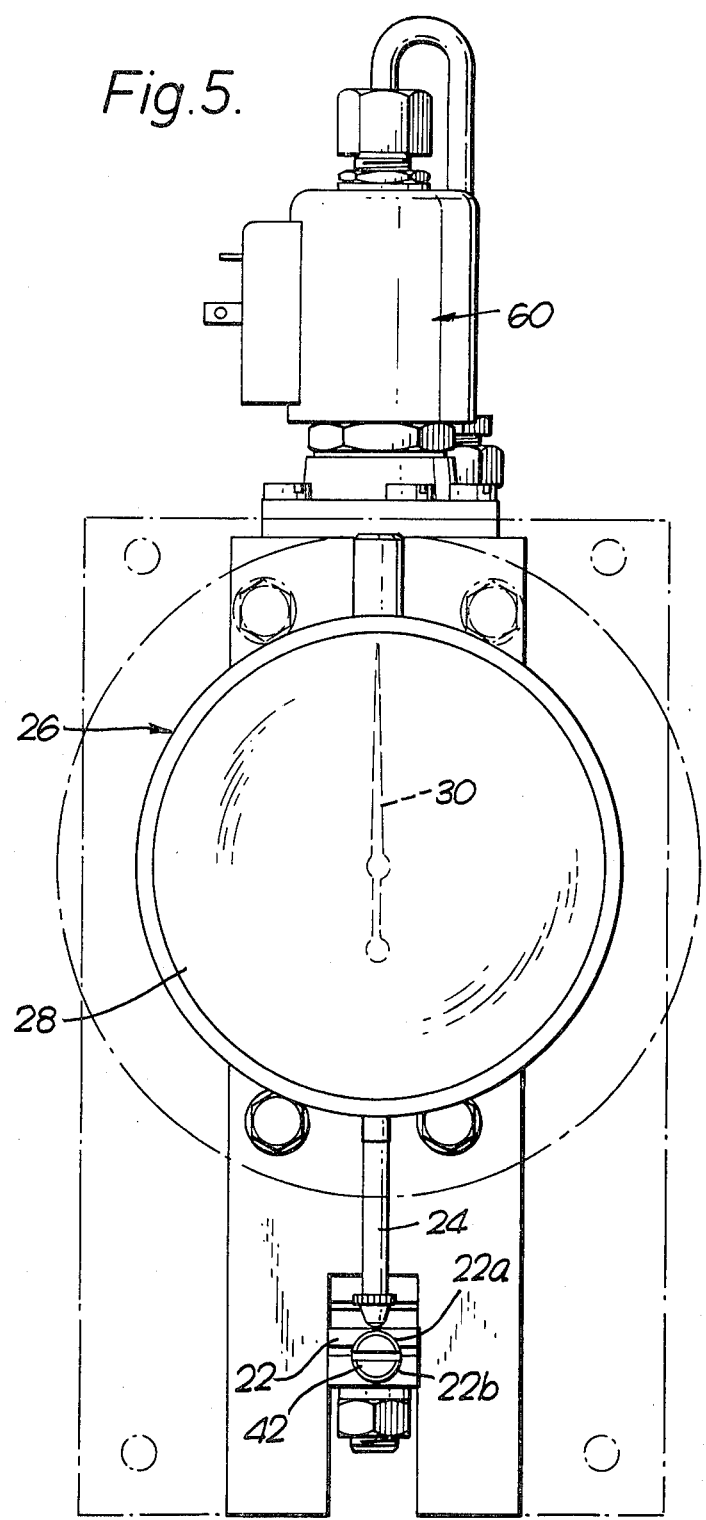
FIG. 5 is a front view of the meter shown diagrammatically in FIGS. 3 and 4.
Figure 6:
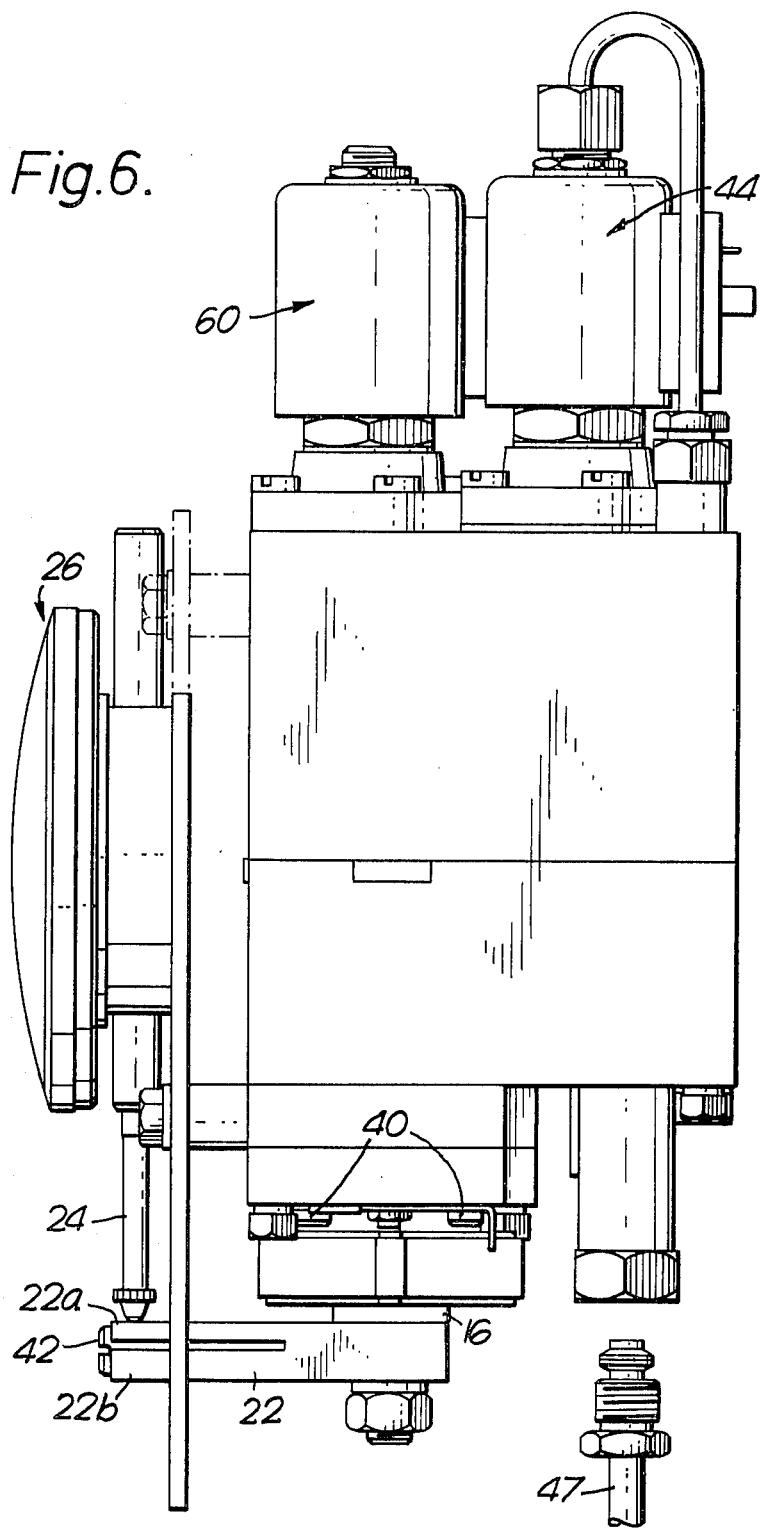
FIG. 6 is a side view of the meter shown in FIG. 5.
Figure 7:
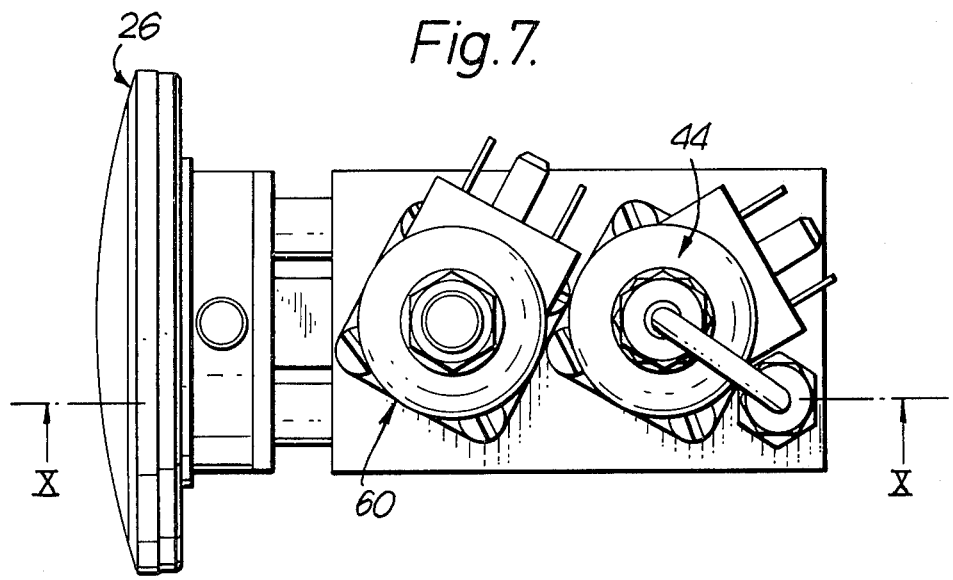
FIG. 7 is a top plan view of the meter shown in FIGS. 5 and 6.
Figure 8:
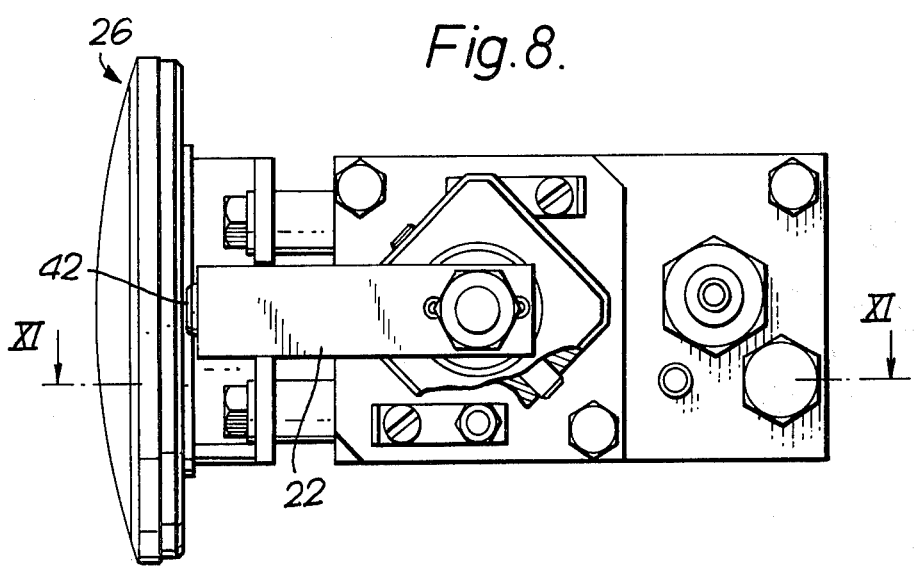
FIG. 8 is an underneath plan view of the meter shown in FIGS. 5 to 7.
Figure 9:
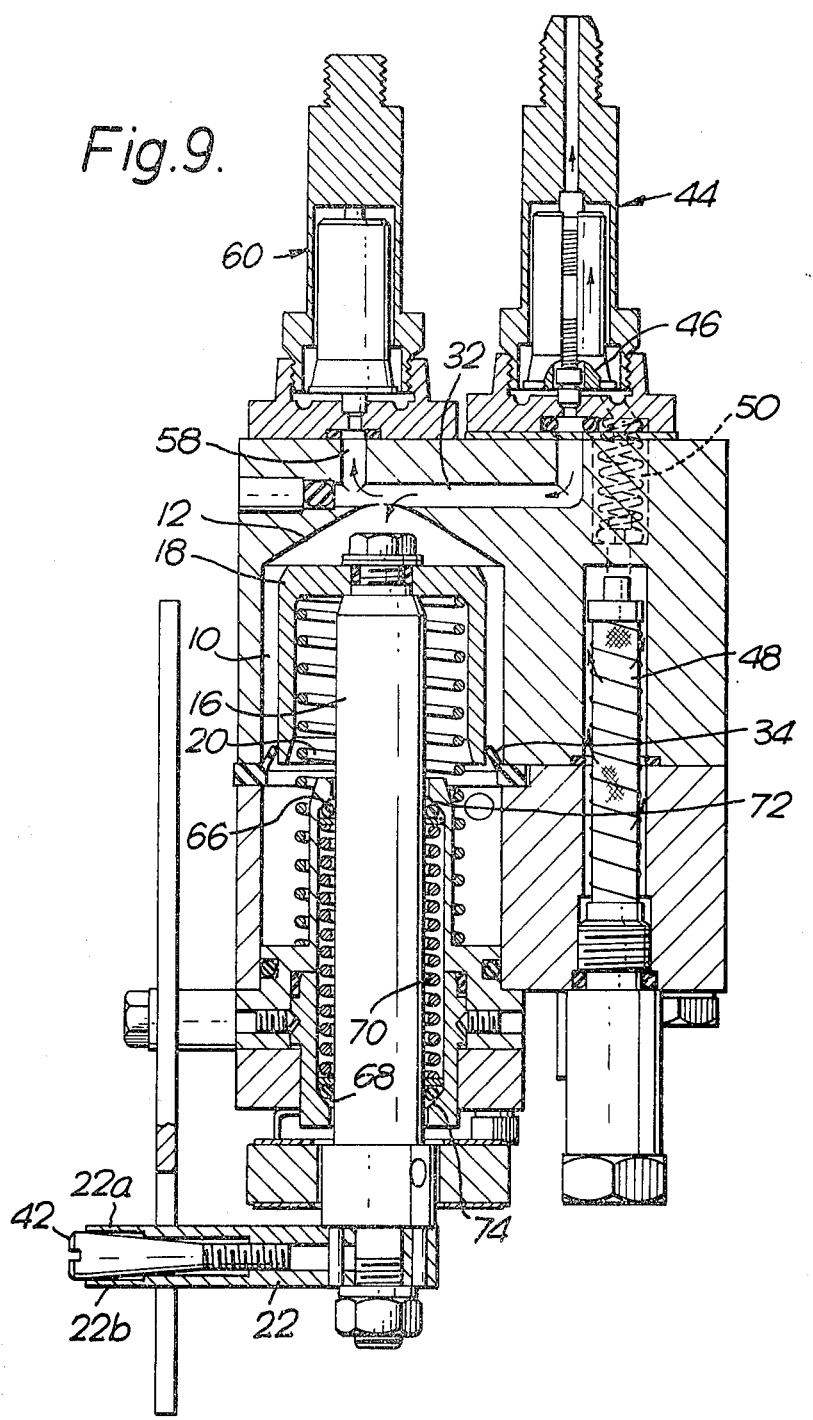
FIG. 9 is a vertical section through the meter shown in FIGS. 5 to 8.
Figure 10:
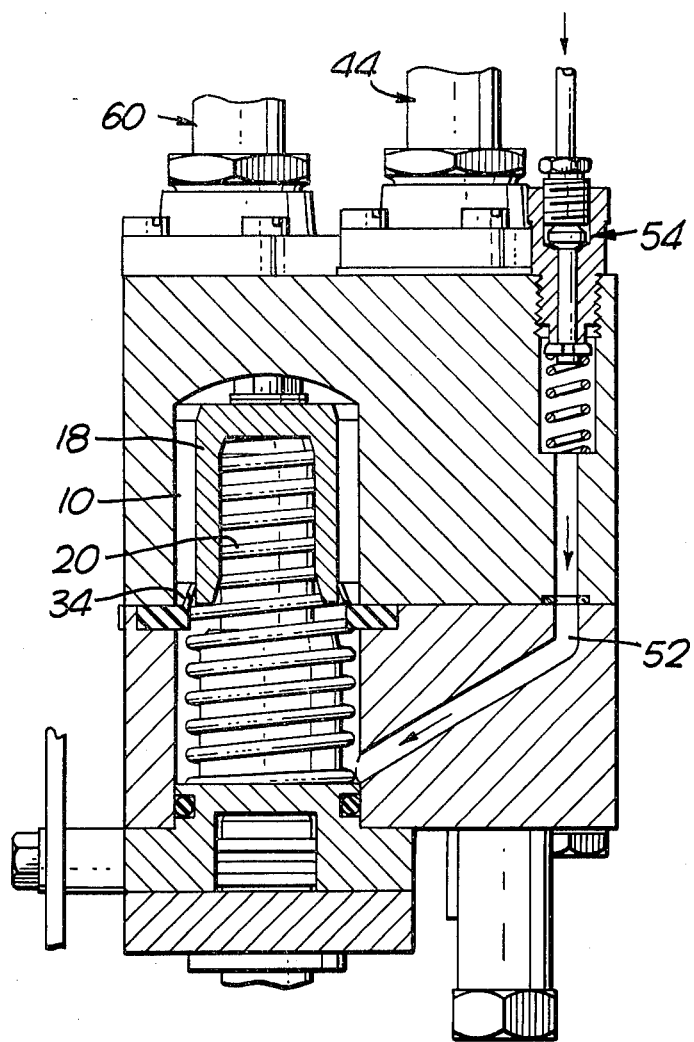
FIG. 10 is a section taken on the line X—X in FIG. 7.

A modification to the hydraulic circuit is effective to prevent both these errors, and this modified system is incorporated in the meter shown in FIGS. 3 to 14. The latter meter has many parts which are identical or similar to corresponding parts in the meter of FIGS. 1 and 2, and the same reference numerals have been used in FIGS. 3 to 14 to indicate such parts. The main difference between the two meters is that the one shown in FIGS. 3 to 14 makes use of a different type of solenoid valve 44 which has two valves and is normally known in the trade as a 'two-way' valve or, alternatively, as a '3-port valve.' The said valve has an inlet 1, as shown in FIGS. 3 and 4, and two outlets 2 and 3, either of which may be open to the inlet 1 (but not both). A spring 62 biasses the solenoid core 64 (to which the two valves of the valve 44 are attached) in one direction so as to permit communication between ports 1 and 2. When energized, the solenoid overcomes the spring bias and closes the communication between ducts 1 and 2 and, at the same time, permits communication between ports 1 and 3.

The operation of the meter shown in FIGS. 3 to 14 is as follows:

When not taking a reading, the solenoids of both valves 44 and 60 are de-energized. Valve 60 is therefore closed, and valve 44 permits fuel to flow through inlet port 1 to outlet port 2, whence the fuel passes through valve 54 and back to the tank via the bottom side of the cylindrical chamber 10. To take a reading, the solenoid 46 is energized to prevent flow towards the valve 54, but to permit flow to the chamber 10 with the result that the piston 18 is displaced against the biassing spring 20. To terminate the reading, the solenoid 46 is de-energized so that fuel once more passes through the valve 54 and back to the tank and, simultaneously, the metered fuel is trapped in the chamber 10. To drain the chamber, the valve 60 is energized, leaving valve 46 de-energized. Before taking the next reading, valve 60 is de-energized so that the system is again ready to take the next reading.

This modified form of meter prevents both of the errors mentioned above in connection with FIGS. 1 and 2 from occurring because the opening pressure of valve 54 can be set so that the pressure required to open valve 54 is the same as that required to overcome the piston spring 20. There is therefore no change in the inlet duct pressure at the commencement of metering. It is true, of course, that as the piston 18 is displaced and the spring 20 is compressed, the pressure in the inlet duct 47 will gradually increase as the quantity of metered fuel increases, but this error (which would be a percentage error and not a constant addition or subtraction to the reading as in the case of the two methods of operation of the device shown in FIGS. 1 and 2) can be compensated for by making the piston an appropriate diameter such that it also has an equal and opposite percentage error to that caused by the expansion of the inlet duct due to the gradual increase in pressure. This modified meter has been found to give entirely satisfactory results in which the overall error is considerably less than 0.1% at any reading.

In use of the meter shown in FIGS. 3 to 14, fuel enters the meter through the inlet duct 47, passes through the filter 48, and then through the pressurizing valve 50. The solenoid valve 44 is de-energized, permitting the fuel to pass through port 1 to port 2 whence it flows through relief valve 54, duct 52 and ultimately back to the tank via the part of the chamber 10 below the piston 18 and the drain duct 56.

When the counting mechanism energizes the solenoid 46 of the valve 44 to permit fuel to pass from port 1 to port 3 of the valve, fuel enters the chamber 10 and displaces the piston 18 downwards against the biassing spring 20. At the end of the count, the counting mechanism again de-energizes the solenoid 46 and the fuel again flows back to the tank as previously explained. At the same time, the valve 44 prevents further flow from port 1 to port 3 and therefore the metered fuel is trapped above the piston 18, and its volume is indicated on the scale 28. The solenoid valve 60 is then operated as explained above in order to drain the fuel from the chamber 10 under the action of the spring 20, through duct 52, as previously explained, and back to the tank. The solenoid valve 60, when de-energized, prevents flow from port 4 to port 5 (and permits flow from port 4 to port 5 when energized).

The pressures prevailing in the two forms of meter shown in the drawings do not vary with different types of fuel injection equipment to be tested since these do not effect the function of each metering system itself. The pressure levels should be as low as possible to overcome seal friction satisfactorily on the one hand, whilst not interfering with the pressure in the inlet duct more than is absolutely necessary. In this connection, the function of the valve 50 is solely to produce a fairly high initial pressure (circa 100 p.s.i.), the purpose of which is to prevent precipitation of undissolved air in the inlet duct which would otherwise happen due to the extreme pressure (circa 15,000 p.s.i) of fuel issuing from a fuel injection nozzle.

The guide means for the piston rod 16 of the piston 18 have been found to be an important matter in practice. FIG. p shows the guide means which comprise two PTFE 'O' rings 66 and 68 biassed apart by a spring 70 with each ring abutting against a concave conical surface 72, 74 so as to press the inner surface of the rings against the piston rod 16. The advantage of this form of guide means arises out of the fact that PTFE (which is used for this purpose because of its very low coefficient of friction) responds to temperature in such a way that the coefficient of friction rises rapidly and the piston rod could otherwise become stiff at elevated temperatures in conventional guide means. The guide means of FIG. 9, however, permit the 'O' rings 66 and 68 to expand without increasing the force between their inner surfaces and the piston rod 16 to any great extent.

Figure 12:
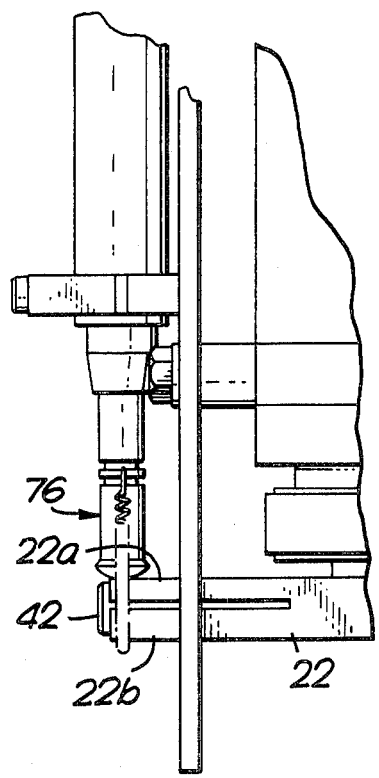
FIG. 12 is a fragmentary side view of the meter shown in FIGS. 5 to 11 with modified indicating means.

In certain circumstances it may be preferred to use a transducer instead of the stem 24 on the indicator 26. Such a construction is shown in FIG. 12 where a transducer assembly 76 is provided in place of the stem 24 shown in other figures of the drawings.

Figure 13:
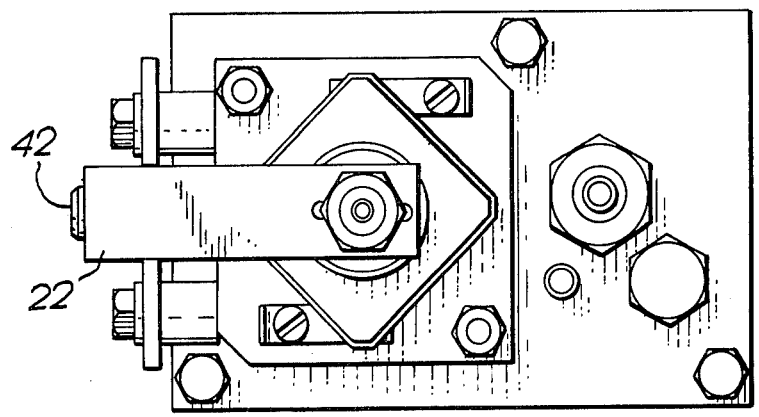
FIG. 13 is a view similar to FIG. 8 illustrating another modification of the meter shown in FIGS. 5 to 11.
Figure 14:
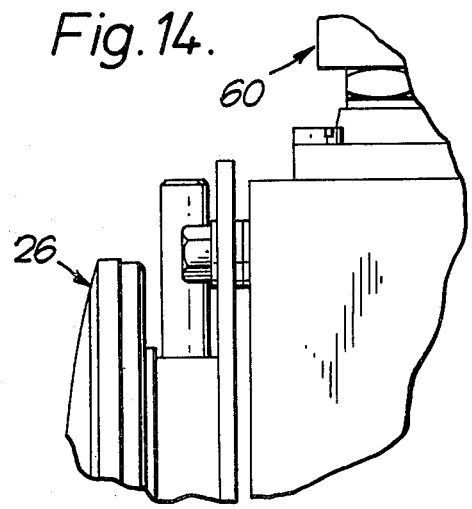
FIG. 14 is a fragmentary side view of the meter shown in FIG. 13.

As already mentioned, the meter can be fitted with two different sizes of piston to enable it to handle two ranges of fuel flow. For example, one piston can be of a size to cope with full quantities of up to 25 cc, while a larger size of piston can deal with fuel quantities of up to 50 cc. Apart from the difference in piston size — and the use of two co-axial springs instead of the single spring 20 — the 50 cc form a meter will also generally have slightly different bolting and mounting arrangements, as shown in FIGS. 13 and 14.

Figure 11:
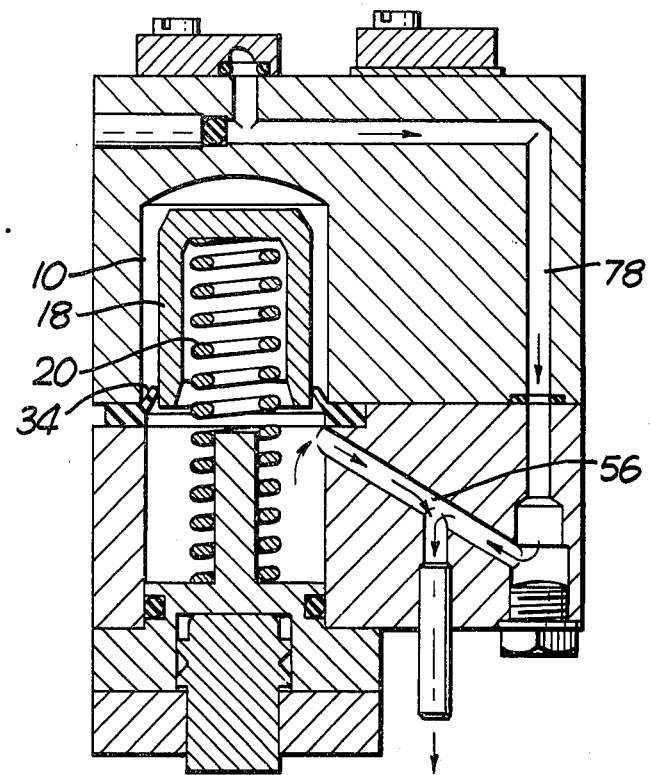
FIG. 11 is a section taken on the line XI—XI in FIG. 8.

There is a small constructional difference between the meter shown diagrammatically in FIGS. 3 and 4 and the commercial form of meter shown in FIGS. 5 to 14. This concerns the duct 78 leading from the valve 60. In FIGS. 3 and 4, the duct 78 joins the duct 52 so that fuel from outlet 5 of the valve 60 passes into the chamber 10 below the piston 18 before going to the drain duct 56. In FIG. 11, however, it will be seen that the duct 78 joins the drain duct 56 directly so that fuel from outlet 5 of the valve 60 does not, in this case, pass first into the chamber 10 below the piston 18. Both forms of construction are acceptable in practice.

I claim:

1. A fuel delivery meter for measuring and indicating the quantity of fuel delivered by engine fuel injection means "on test," the said meter comprising a chamber, a first opening in said chamber for receiving fuel delivered by engine fuel injection means, a spring-loaded piston within the chamber arranged to be displaced by fuel entering the chamber, indicating means operatively connected to the said piston so as to be actuated by displacement of said piston to give a reading which corresponds to the amount of fuel which has entered said chamber, at least one further opening in said chamber on that side of the piston remote from said first opening, a fuel circuit including fuel flow means for passing delivered fuel into said chamber through said further opening so as to warm the meter, and a simple solenoid-operated valve in said fuel circuit together with a three-port solenoid-operated valve, the said three-port valve serving to control the flow of fuel into the chamber to displace the piston and also to permit the flow of fuel into the chamber on that side of the piston remote from said first opening so as to warm the meter, and said simple solenoid-operated valve serving to control the flow, out of the chamber, of that fuel received by the chamber to displace the piston.

2. A fuel delivery meter according to claim 1, in which said spring-loaded piston is guided by guide means comprising two PTFE 'O' rings urged apart by a spring, with each ring abutting against a concave conical surface so that the inner surfaces of the rings are pressed against a piston rod of said piston.

3. A fuel delivery meter according to claim 1, in which a spring-loaded valve is provided to produce a sufficiently high initial pressure in the fuel entering the meter to prevent precipitation of undissolved air in a fuel-inlet duct of the meter.

4. A fuel delivery meter according to claim 1, in which a second spring-loaded valve is included in the fuel flow means for passing fuel into the chamber on that side of the piston remote from said first opening.

* * * * *